United States Patent
Xu

(10) Patent No.: US 9,427,673 B2
(45) Date of Patent: Aug. 30, 2016

(54) RETRACTABLE LEASH FOR A SWING CAR

(71) Applicant: ZheJiang JinBang Sports Equipment Co., Ltd., Lishui, Zhejiang (CN)

(72) Inventor: Yongqiang Xu, Zhejiang (CN)

(73) Assignee: ZheJiang JinBang Sports Equipment Co., Ltd. (CN)

(*) Notice: Subject to any disclaimer, the term of this patent is extended or adjusted under 35 U.S.C. 154(b) by 0 days.

(21) Appl. No.: 14/551,055

(22) Filed: Nov. 23, 2014

(65) Prior Publication Data

US 2015/0238878 A1 Aug. 27, 2015

(30) Foreign Application Priority Data

Feb. 27, 2014 (CN) .................. 2014 2 0085260 U

(51) Int. Cl.
| | | |
|---|---|---|
| *F03G 1/00* | (2006.01) | |
| *A63H 29/04* | (2006.01) | |
| *A63H 17/00* | (2006.01) | |
| *F16F 1/10* | (2006.01) | |

(52) U.S. Cl.
CPC ............. *A63H 29/04* (2013.01); *A63H 17/00* (2013.01); *F03G 1/00* (2013.01); *F16F 1/10* (2013.01)

(58) Field of Classification Search
CPC ............ A63H 29/04; F03G 1/00; F03G 1/08
USPC ......... 185/37, 39; 242/371, 375, 375.2, 376; 446/249, 430, 464
See application file for complete search history.

(56) References Cited

U.S. PATENT DOCUMENTS

| | | | | |
|---|---|---|---|---|
| H517 H | * | 9/1988 | Sato .......................... | F02N 3/02 123/185.2 |
| 4,842,567 A | * | 6/1989 | Hiraide .................. | A63H 29/04 185/39 |
| 7,793,497 B2 | * | 9/2010 | Alacqua .............. | E05B 47/0009 185/37 |
| 2014/0262616 A1 | * | 9/2014 | Cullum ................... | E06C 7/188 182/107 |

* cited by examiner

*Primary Examiner* — Phillip A Johnson

(57) ABSTRACT

A retractable leash for a swing car comprising a front cover further comprising threaded holes an opening, a back cover further comprising threaded holes an opening, a recoil spring, a rotatable guide rail in a hollow cylindrical structure, and a rope with a free end; wherein the threaded holes in the front cover and back cover correspond to each other, wherein the front cover and the back cover are conjoint by the thread holes and screws to enclose the recoil spring, rotatable guide rail, and the rope, wherein the recoil spring is disposed inside of the rotatable guide rail, wherein the recoil spring is fixedly to the back cover, wherein the opening on the front cover and the back cover correspond to each other, and the free end of the rope extends out of the openings.

4 Claims, 2 Drawing Sheets

RETRACTABLE LEASH FOR A SWING CAR

CROSS-REFERENCE TO RELATED APPLICATIONS

The present application claims priority based on Chinese Application No. 201420085260.9 filed on Feb. 27, 2014, the disclosure of which is hereby incorporated by reference in its entirety.

TECHNICAL FIELD

The present application relates to a leash device for toys, and particular to a Retractable Leash for a Swing Car.

BACKGROUND

In existing technology, a swing car is a simple children's toys depending on only steering wheel rotation to keep the swing car running without other device to provide power for the swing car. The function and the structure of the existing swing car are simple. What is needed is a retractable leach to pull the swing car.

SUMMARY

The present application is directed to a retractable leash for a swing car that can comprise a front cover further comprising threaded holes an opening, a back cover further comprising threaded holes an opening, a recoil spring, a rotatable guide rail in a hollow cylindrical structure, and a rope with a free end; wherein the threaded holes in the front cover and back cover correspond to each other, wherein the front cover and the back cover are conjoint by the thread holes and screws to enclose the recoil spring, rotatable guide rail, and the rope, wherein the recoil spring is disposed inside of the rotatable guide rail, wherein the recoil spring is fixedly to the back cover, wherein the opening on the front cover and the back cover correspond to each other, and the free end of the rope extends out of the openings.

Furthermore, both ends of the rotatable guide rail can be equipped with an annular fixed plate respectively.

Furthermore, the rope can be closely sheathed on the outside of the rotatable guide rail.

Furthermore, a lateral wall of the recoil spring can be closely fitted with the inside wall of the rotatable guide rail.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

Further features and advantages of the present device, as well as the structure and operation of various embodiments of the present device, will become apparent and more readily appreciated from the following description or the preferred embodiments, taken in conjunction with the accompanying drawing of which.

DETAILED DESCRIPTION

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementation. The following detailed description is, therefore, not to be taken in a limiting sense.

Figure 1:
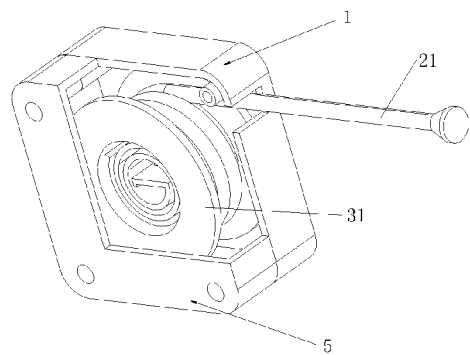
FIG. 1 is an structure schematic drawing of a retractable leash for a swing car.
Figure 2:
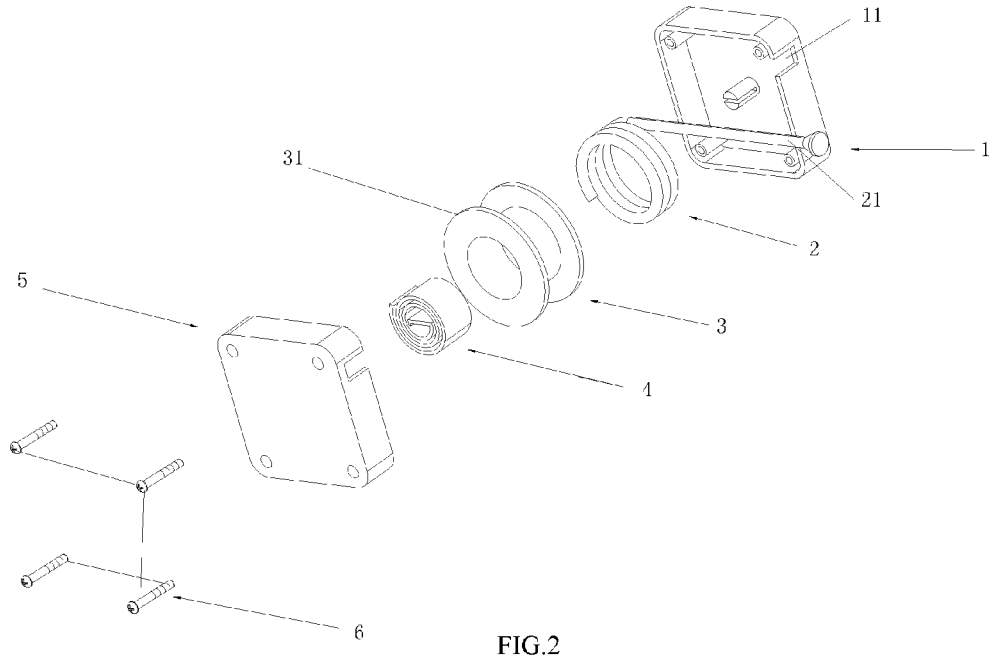
FIG. 2 is an exploded view of the retractable leash for a swing car.
Figure 3:
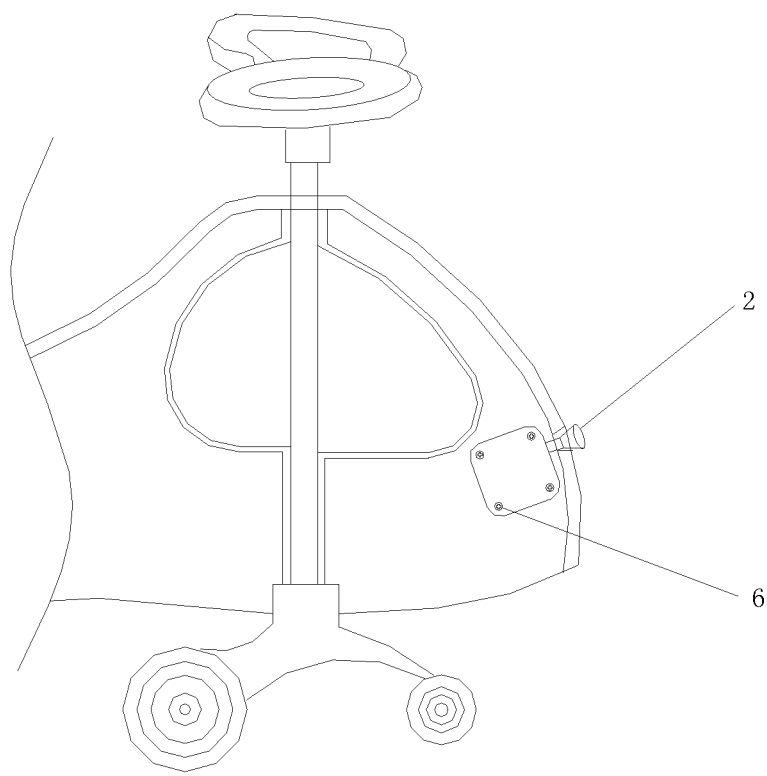
FIG. 3 is an assembly schematic of a telescopic rope device for a swing car according to the present application.

Referring to FIG. 1 to FIG. 3, the present application discloses a retractable leash for a swing car can comprise front cover 1 and a back cover 5. A rotatable guide rail 3 with a hollow cylindrical structure is set within the enclosure formed by the front cover 1 and the back cover 5. There are threaded holes on the front cover 1, and there are threaded holes are on the back cover 5. The threaded holes correspond to each other to enable the front cover 1 and the back cover to be conjoined by screws 6 to form an enclosure. A coil spring 4 is set inside of the rotatable guide rail 3. The coil spring 4 is fixedly connected with the back cover 5. A rope 2 is set on the outside of the rotatable guide rail 3. The rope 2 has a free end 21. The front cover 1 and the back cover each can further comprise an opening 11. The opening in the front cover 1 and the back cover 5 corresponds to each other. The free end 21 of the rope 2 extends out of the openings in the front cover and the back cover.

Both ends of the rotatable guide rail 3 can be equipped with an annular fixed plate respectively. The rope 2 can be closely sheathed on the outside of the rotatable guide rail 3. Furthermore, a lateral wall of the coil spring 4 is closely fitted with the inside wall of the rotatable guide rail 3.

When the user pulls the rope 2, the rotatable guide rail 3 starts running, which in turn winds the recoil spring 4. In order to store elastic potential energy, and then loosen the rope 2, elastic potential energy stored in the recoil spring 4 is transformed to kinetic energy, and then the rotatable guide rail 3 is rotated to the opposite direction hence achieving the function.

What is claimed is:

1. A retractable leash for a swing car comprising:
a front cover further comprising four threaded holes and an opening,
a back cover further comprising four threaded holes and an opening,
a recoil spring,
a rotatable guide rail with a hollow cylindrical structure, and
a rope with a free end;
wherein the front cover and the back cover are a square shaped, wherein the four threaded holes in the front cover and the back cover are located near the four corners of the front cover and back cover, wherein a spindle is located in the center of the back cover wherein the spindle further comprising a receiving slot, wherein the distances from each threaded hole to the spindle are equal, wherein the threaded holes in the front cover and back cover correspond to each other, wherein the front cover and the back cover are conjoint by the thread holes and screws to enclose the recoil spring, rotatable guide rail, and the rope, wherein the recoil spring is disposed inside of the rotatable guide rail, wherein the recoil spring is removably connected to the back cover through the receiving slot, wherein the opening on the front cover and the back cover correspond to each other, and the free end of the rope extends out of the openings.

2. The retractable leash for a swing car as described in claim 1, wherein both ends of the rotatable guide rail are equipped with an annular fixed plate respectively.

3. The retractable leash for a swing car as described in claim 2, wherein the rope is sheathed on the outside of the rotatable guide rail.

4. The retractable leash for a swing car as set forth in claim 3, wherein a lateral wall of the recoil spring is fitted with the inside wall of the rotatable guide rail.

* * * * *